(12) United States Patent
Malbois et al.

(10) Patent No.: US 12,163,661 B2
(45) Date of Patent: Dec. 10, 2024

(54) DIFFUSION CONE FOR THE REAR PART OF A JET ENGINE INCORPORATING A FLAME-HOLDER RING AT THE TRAILING EDGE

(71) Applicant: SAFRAN AIRCRAFT ENGINES, Paris (FR)

(72) Inventors: Pierre André Gabriel Malbois, Moissy-Cramayel (FR); Clément Jean Henri Bechet, Moissy-Cramayel (FR); Emmanuel Jean André Greslin, Moissy-Cramayel (FR); Romain Nicolas Lunel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/555,890

(22) PCT Filed: Apr. 15, 2022

(86) PCT No.: PCT/FR2022/050714
§ 371 (c)(1),
(2) Date: Oct. 18, 2023

(87) PCT Pub. No.: WO2022/223914
PCT Pub. Date: Oct. 27, 2022

(65) Prior Publication Data
US 2024/0200779 A1    Jun. 20, 2024

(30) Foreign Application Priority Data
Apr. 19, 2021   (FR) ..................................... 2103992

(51) Int. Cl.
*F23R 3/20*    (2006.01)
*F02K 1/04*    (2006.01)
*F02K 3/10*    (2006.01)

(52) U.S. Cl.
CPC .................. *F23R 3/20* (2013.01); *F02K 1/04* (2013.01); *F02K 3/10* (2013.01)

(58) Field of Classification Search
CPC ..... F23R 3/20; F02K 1/04; F02K 3/08; F02K 3/10; F02K 3/105; F02K 3/11; F05D 2250/232; F05D 2250/323
See application file for complete search history.

(56) References Cited

U.S. PATENT DOCUMENTS 2,882,679  A  *  4/1959  Karcher .................... F23R 3/20
                                                            60/264
2,914,912  A  *  12/1959  Woll ......................... F02K 7/10
                                                            60/749

(Continued)

FOREIGN PATENT DOCUMENTS

EP        1457738 B1    5/2010
FR        3097298 A1    12/2020
JP        2006010179 A   1/2006

OTHER PUBLICATIONS

Search Report for French Application No. 21 03992 dated Mar. 1, 2022.

(Continued)

*Primary Examiner* — Alain Chau
(74) *Attorney, Agent, or Firm* — Pearne & Gordon LLP

(57) ABSTRACT

A diffusion cone for the rear part of a jet engine has a base and, on an opposite side, a truncated tip defining an annular trailing edge, and comprises a flame-holder ring with a cross section comprising an external branch and an internal branch which are connected to one another on the base side and such that the external branch extends around the internal branch, whereby the external and internal branches delimit between them an internal space opening on the opposite side to the base. One of the branches is made up of the annular trailing edge. The flame-holder ring comprises at least one (Continued)

fuel inlet designed to let fuel into the internal space. Such a flame-holder ring makes it possible to ensure and to control the propagation of the flame within the afterburner channel.

12 Claims, 3 Drawing Sheets

(56) References Cited

U.S. PATENT DOCUMENTS

| | | | |
|---|---|---|---|
| 2,929,203 | A | 3/1960 | Henning et al. |
| 3,009,317 | A | 11/1961 | Meyer et al. |
| 4,798,048 | A * | 1/1989 | Clements ................ F23R 3/20 60/764 |
| 5,367,874 | A | 11/1994 | Auffret et al. |
| 6,363,725 | B1 | 4/2002 | Mei et al. |
| 7,287,383 | B2 * | 10/2007 | Bunel ................ F23R 3/20 60/765 |
| 7,866,162 | B2 * | 1/2011 | Blanchard ................ F02K 1/04 239/265.11 |
| 2005/0086941 | A1 * | 4/2005 | Bunel ................ F23R 3/20 60/761 |
| 2008/0104941 | A1 * | 5/2008 | Blanchard ................ F02K 1/04 60/272 |

OTHER PUBLICATIONS

Search Report for International Application No. PCT/FR2022/050714 dated Aug. 9, 2022.
Written Opinion for PCT/FR2022/050714 dated Aug. 9, 2022.

* cited by examiner

DIFFUSION CONE FOR THE REAR PART OF A JET ENGINE INCORPORATING A FLAME-HOLDER RING AT THE TRAILING EDGE

This is the National Stage of PCT international application PCT/FR2022/050714, filed on Apr. 15, 2022 entitled "DIFFUSION CONE FOR THE REAR PART OF A JET ENGINE, INCORPORATING A FLAME-HOLDER RING AT THE TRAILING EDGE", which claims the priority of French Patent Application No. 2103992 filed Apr. 19, 2021, both of which are incorporated herein by reference in their entireties.

TECHNICAL FIELD

The present invention relates to the field of turbojet engines intended for propelling aircraft and comprising an afterburner channel. It relates more particularly to a diffusion cone for the rear part of the turbojet engine, a rear part of a turbojet engine comprising such a diffusion cone, and a turbojet engine comprising same.

PRIOR ART

Turbojet engines of a known type, in particular intended for supersonic flight, comprise, in the rear part thereof, also referred to as the rear body, an afterburner channel, also referred to as a "heating channel", wherein the flow of gas coming from the turbine can undergo new combustion by virtue of the oxygen remaining within it, before expanding in an ejection nozzle.

This channel is delimited internally by a turbine outlet cone, referred to as a diffusion cone, generally having the additional function of limiting detrimental vibratory phenomena known by the term "screech" in English terminology, by means of series of holes, through or not, referred to as "anti-screech holes", formed in the downstream part of the diffusion cone and/or by means of one or more chambers, referred to as "anti-screech chambers", attached to the internal surface of the diffusion cone.

Fuel injection devices in the form of arms are in general arranged at the inlet of the combustion channel, example around the diffusion cone, to diffuse fuel downstream in the direction of a flame-holder device intended to stabilize the flame in the afterburner channel.

Such a flame-holder device typically comprises an annular row of flame-holder arms extending radially, intended to promote radial propagation of the flame along each of the arms, and a flame-holder ring connecting them in pairs to promote circumferential propagation of the flame, from arm to arm. Such a flame-holder ring generally has a C-shaped or V-shaped cross-section, defining to arms rigidly connected to each other on the upstream side of the turbojet engine, and having towards downstream free ends that, in operation, promote the appearance of recirculation zones for the gas flow, contributing to the stabilization of the flame.

Designing such a flame-holder device involves making a compromise between the ability of the device to best hold and stabilize the flame, and the pressure drop caused by the obstruction of the afterburner channel by the device.

In addition, such a device has limited ability to carburize the core of the afterburner channel and therefore to allow satisfactory combustion in this zone during the operation of the afterburning, which results in some cases in a thermal profile at the discharge of the nozzle having a hollow at its center, which may impair the thrust of the turbojet engine.

In this context, there is a need for an improved rear part of a turbojet engine.

DESCRIPTION OF THE INVENTION

For this purpose the invention proposes a diffusion cone intended to internally delimit the inlet of an afterburner channel in a rear part of a turbojet engine, comprising an annular wall extending from a base while converging towards an opposite side where said annular wall forms a truncated tip of the diffusion cone defining an annular trailing edge of the latter, and comprising a flame-holder ring with a cross-section comprising an external branch and an internal branch rigidly connected to each other on the base side and such that the external branch extends around the internal branch, by means of which the external and internal branches delimit between them an internal space of the flame-holder ring emerging on the side opposite to the base of the diffusion cone, one of the external and internal branches consisting of said annular trailing edge, and the flame-holder ring including at least one fuel inlet arranged for admitting fuel into the internal space of the flame-holder ring.

Such a flame-holder ring makes it possible to ensure and control the propagation of the flame at the core of the afterburner channel.

According to other advantageous aspects of the invention, the connection device has one or more of the following features, taken in isolation or in accordance with all technically possible combinations:

the external arm is said arm consisting of said annular trailing edge;

the diffusion cone furthermore comprises an annular thermal-protection screen that is arranged between the external and internal branches so as to partially obstruct an opening through which the internal space of the flame-holder ring emerges on the side opposite to the base of the diffusion cone, and conformed so as to delimit, along each of the external and internal branches, a corresponding outlet passage through which the internal space of the flame-holder ring emerges on the side opposite to the base of the diffusion cone;

the fuel inlet is arranged on the same side as the base of the diffusion cone.

The invention also relates to a rear part of a turbojet engine, comprising an afterburner channel, an afterburner-channel housing surrounding said channel, a diffusion cone of the type described above internally delimiting said channel, and a fuel-injection system configured to inject fuel into the internal space of the flame-holder ring through said fuel inlet.

In preferred embodiments of the invention, the rear turbojet-engine part furthermore comprises an annular row of flame-holder arms having radially internal ends arranged axially facing the flame-holder ring.

In preferred embodiments of the invention, the flame-holder arms extend freely with respect to each other from their radially external ends.

In preferred embodiments of the invention, the rear part of the turbojet engine furthermore comprises an air-circulation system configured to supply the internal space of the flame-holder ring with air coming from a secondary flow of the turbojet engine.

The invention also relates to a turbojet engine for an aircraft, comprising a diffusion cone of the type described above and a rear part of the type described above.

BRIEF DESCRIPTION OF THE DRAWINGS

The invention will be better understood, and other details, advantages and features thereof will emerge from the reading of the following description made non-limitatively and with reference to the accompanying drawings, wherein.

In all these figures, identical references can designate identical or similar elements.

DETAILED DESCRIPTION OF PREFERRED EMBODIMENTS

Figure 1:
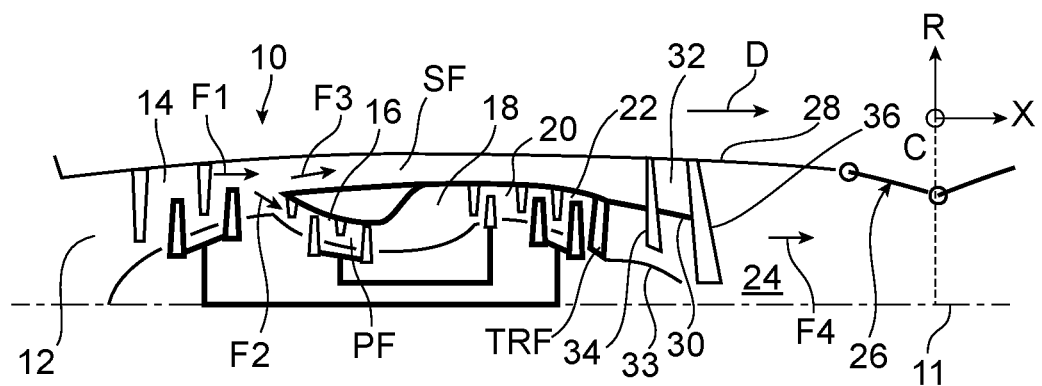
FIG. 1 is a schematic half-view in axial section of a turbojet engine comprising an afterburner channel.

FIG. 1 illustrates a turbojet engine 10, for example of the twin spool and bypass type, intended for example for propelling an aircraft suitable for supersonic flight, and therefore intended in particular to be installed in the fuselage of such an aircraft. The invention is of course applicable to other types of turbojet engine.

In the whole of this description, the axial direction X is the direction of the longitudinal axis 11 of the turbojet engine. Except when it is stipulated otherwise, the radial direction R is at every point a direction orthogonal to the longitudinal axis 11 and passing through it, and the circumferential direction C (sometimes called the azimuthal or orthoradial direction) is at every point a direction orthogonal to the radial direction R and to the longitudinal axis 11. The qualifiers "upstream" and "downstream" are defined with reference to a general direction D of flow of the gases in the turbojet engine 10.

By way of illustration, such a turbojet engine 10 comprises, from upstream to downstream, an air inlet 12, a low-pressure compressor 14, a high-pressure compressor 16, a combustion chamber 18, a high-pressure turbine 20, a low-pressure turbine 22, an afterburner channel 24, and a variable-geometry nozzle 26, for example of the convergent-divergent type. These turbojet-engine members are all centered on the longitudinal axis 11 thereof.

An afterburner-channel housing 28 surrounds said channel.

In addition, a flow-separation collar 30, usually referred to as "confluence", extends downstream from a rear housing TRF of the low-pressure turbine 22, inside the housing 28, concentrically with the latter, so as to externally delimit the inlet of the afterburner channel 24 and to delimit, with the housing 28, an annular channel 32 forming the downstream end of the secondary duct SF.

Finally, a diffusion cone 33 extends downstream in line with a hub of the rear housing TRF of the low-pressure turbine 22, so as to internally delimit the inlet of the afterburner channel 24.

In a well known manner, the high-pressure compressor 16, the combustion chamber 18 and the high-pressure 20 and low-pressure 22 turbines define a primary duct PF. The latter is surrounded by a secondary duct SF of the turbine engine that extends from upstream to downstream, from an outlet of the low-pressure compressor 14 to a downstream end of the flow-separation collar 30, and which therefore includes the aforementioned annular channel 32.

Thus, in operation, air F1 that has entered through the air inlet 12 and was compressed by the low-pressure compressor 14 next divides into a primary flow F2 that circulates in the primary duct PF and into a secondary flow F3 that circulates in the secondary duct SF. The primary flow F2 is then compressed further in the high-pressure compressor 16, and then mixed with fuel and ignited in the combustion chamber 18, before undergoing expansion in the high-pressure turbine 20 and then in the low-pressure turbine 22.

The combustion gases constituting the primary flow F2 discharged from the turbine and the secondary flow F3 mix in the afterburner channel 24 from the downstream end of the flow-separation collar 30, and thus constitute a flow of exhaust gas F4 that continues its circulation in the afterburner channel 24 and then escapes from the turbojet engine 10 through the outlet delimited by the nozzle 26.

At operating speed with afterburning, for example for propelling an aircraft at supersonic speeds, fuel is injected into the gas flow in the afterburner channel 24, and the mixture thus formed is ignited in this channel in order to generate extra thrust.

For this purpose, fuel-injection devices 34 in the general form of arms are arranged at the inlet of the afterburner channel 24 to vaporize fuel downstream in the direction of a flame-holder device 36 intended to promote stabilization of the flames.

Figure 2:
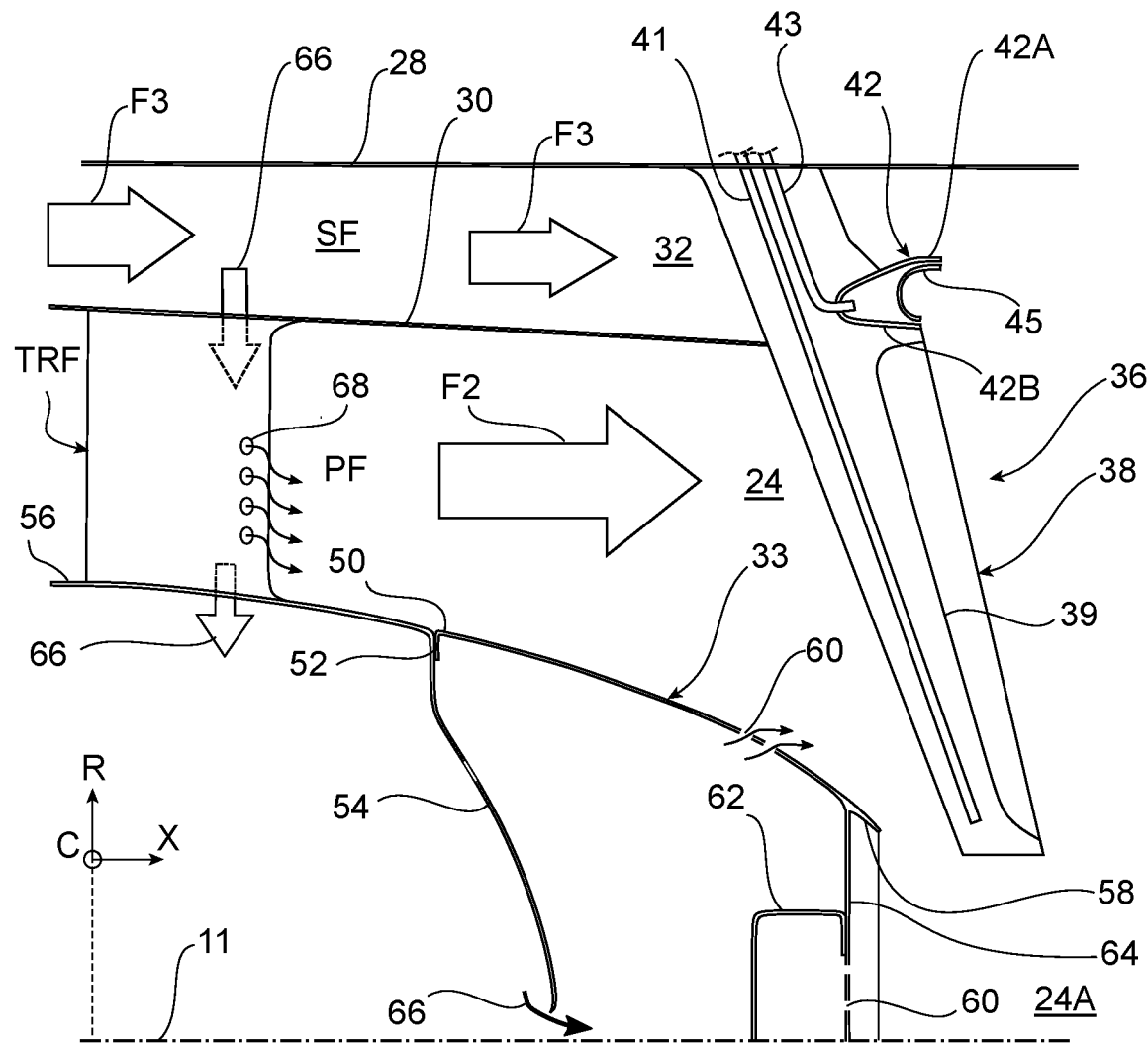
FIG. 2 is a schematic half-view in axial section of a rear part of a turbojet engine of a known type.

FIG. 2 illustrates to a larger scale the rear part of such a turbojet engine, in a known configuration. This figure shows in particular the flame-holder device 36, which comprises an annular row of flame-holder arms 38 extending radially with respect to the longitudinal axis 11 of the turbojet engine, and a flame-holder ring 42 centered on the axis 11 and connecting the flame-holder arms 38 in pairs.

The flame-holder arms 38 are intended to promote radial propagation of the flame along each of the arms, while the flame-holder ring 42 is intended to promote circumferential propagation of the flame, from arm to arm.

The flame-holder arms 38 are each connected to the afterburner-channel housing 28, from which these arms extend radially inwards.

In the example illustrated on FIG. 2, the flame-holder ring 42 is arranged at the downstream end of the annular space 32 forming the downstream end of the secondary duct SF. In other known configurations, the flame-holder ring 42 is arranged inside the flow-separation collar 30.

The flame-holder arms 38 in general comprise means for circulating within them relatively cool air coming from the secondary duct SF, in order to provide thermal protection for the flame-holder arms. These arms for example each comprise a thermal protection device 39 able to channel the cool air coming from the secondary duct. In some cases, such as the example illustrated, the flame-holder arms 38 furthermore comprise fuel-injection means 41.

The flame-holder ring 42 has a concave cross section in the direction of the downstream end, roughly in a C shape or V shape, thus defining two branches 42A, 42B rigidly connected to each other on the upstream side and having on the downstream side free ends that, in operation, promote the appearance of zones for recirculation of the gas flow, contributing to the stabilization of the flame. The flame-holder ring 42 in general also includes means for circulating in it cool air coming from the secondary duct SF and, in some cases, such as the example illustrated, fuel-injection means 43. The flame-holder ring 42 typically includes a thermal protection screen 45 arranged between the branches 42A and 42B for channelling the cool air coming from the secondary duct and thus protecting the ring 42 on the downstream side with regard to the surrounding hot gases and the thermal radiation of the flame.

With regard to the diffusion cone 33, this consists mainly of an annular wall with a shape converging towards the downstream end, and has at its upstream end a base 50, for example provided with a radial flange 52, secured to a downstream-end collar 54 of the rear housing TRF, said collar 54 extending radially inwards from a downstream end of the hub 56 of the rear housing. On the downstream side, the diffusion cone 33 has a truncated tip defining an annular trailing edge 58.

In addition to its function consisting in externally conforming the inlet of the afterburner channel 24 in line with the primary duct PF, the diffusion cone 33 can furthermore be designed to limit detrimental vibratory phenomena known by the term "screech", which relate to high-frequency resonances promoted by the presence of a flame-holder device. To limit such phenomena, the diffusion cone 33 is for example provided with holes 60, through or not, referred to as "anti-screech holes", formed in the downstream part of the annular wall of the diffusion cone, and by means of a chamber 62, referred to as an "anti-screech chamber", attached to an internal surface of the diffusion cone 33, example on the internal surface of a transverse downstream-end wall 64 of the diffusion cone 33, beyond which the annular trailing edge 58 is formed projecting towards the downstream end and radially inwards. The transverse downstream-end wall 64 is typically also provided with anti-screech holes 60 facing the wall constituting the anti-screech chamber 62.

The diffusion cone is in general ventilated by means of a cool-air flow taken from the secondary duct SF, corresponding to the arrows 66 in FIG. 2. This airflow is for example discharged through all or some of the anti-screech holes 60. This of course does not form an obstacle to another part of the airflow taken from the secondary duct being discharged in the primary duct PF through openings 68 formed in radial arms of the rear housing TRF.

However, it is desirable in some cases to improve the holding and stabilization of the flame at the core 24A of the afterburner channel 24.

The document U.S. Pat. No. 4,798,048 proposes a diffusion cone incorporating an annular recess provided with a double wall, located in an axially median region of the cone, between the base of the cone and the downstream end thereof, to generate a flow-recirculation zone. Supposing that such an advantage is actually obtained with this device, the two objectives mentioned above would actually be solved at least to a certain extent. Such a proposal does however have the drawback of making it necessary to completely review the configuration of the cone, and in particular the configuration of the means intended to limit the vibratory phenomena of "screech" where necessary.

In addition, it is in general desirable to improve the carburation of the flame at the core 24A of the afterburner channel, which the diffusion cone of the aforementioned document does not allow.

The present invention proposes a solution to these problems, consisting in providing a flame-holder ring at the downstream end of the diffusion cone 33, taking advantage of the annular trailing edge 58 of the cone to form a branch of the flame-holder ring, and providing the flame-holder ring with a fuel inlet for supplying the flame-holder ring with fuel, as will appear more clearly hereinafter.

Such a flame-holder ring improves the holding and stabilization of the flame at the core of the afterburner channel without calling into question the overall configuration of the diffusion cone, and furthermore improves the carburation of the flame at the core of the afterburner channel.

Figure 3:
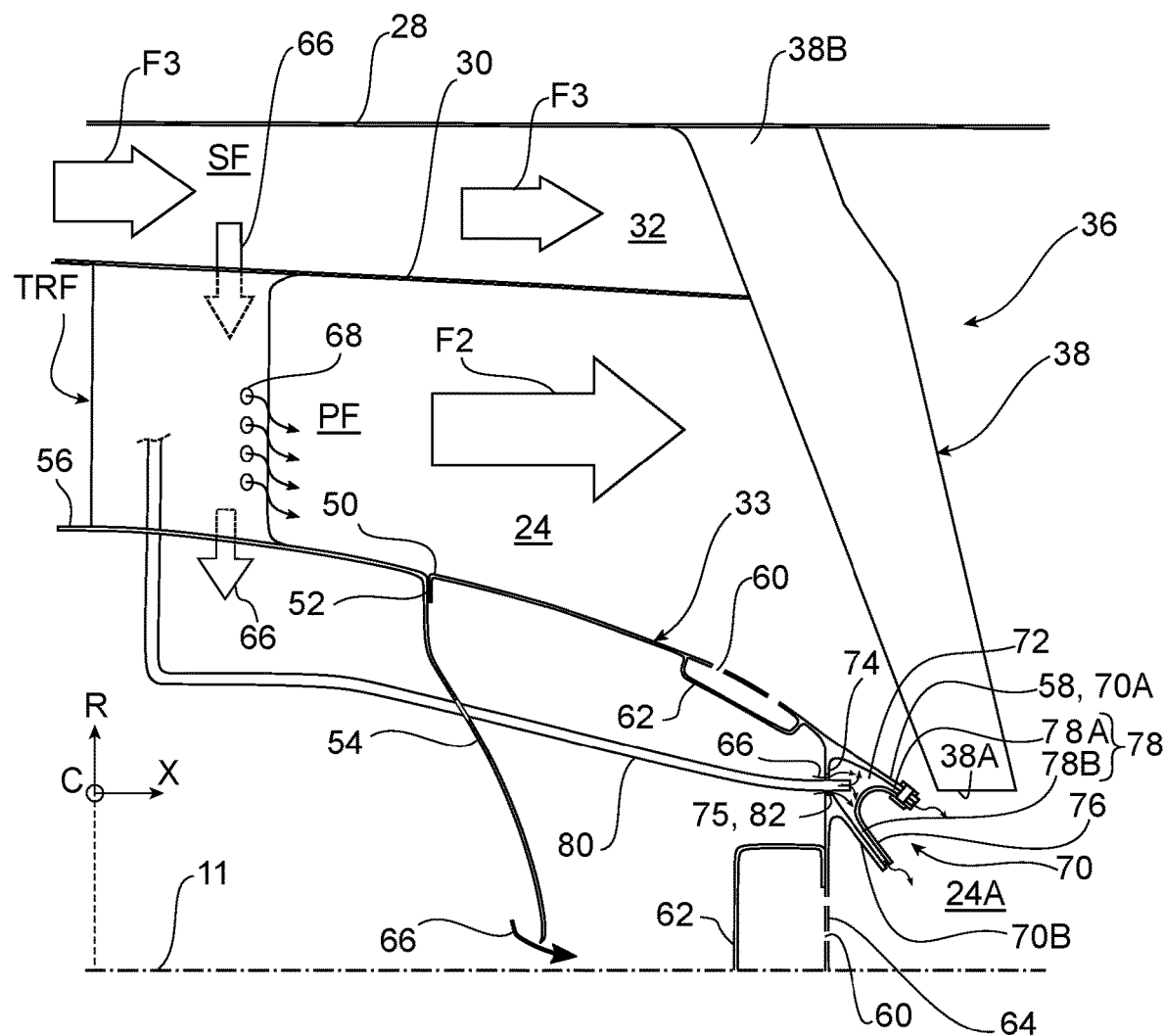
FIG. 3 is a schematic half-view in axial section of a rear part of the turbojet engine of FIG. 1, comprising a diffusion cone according to a preferred embodiment of the invention.
Figure 4:
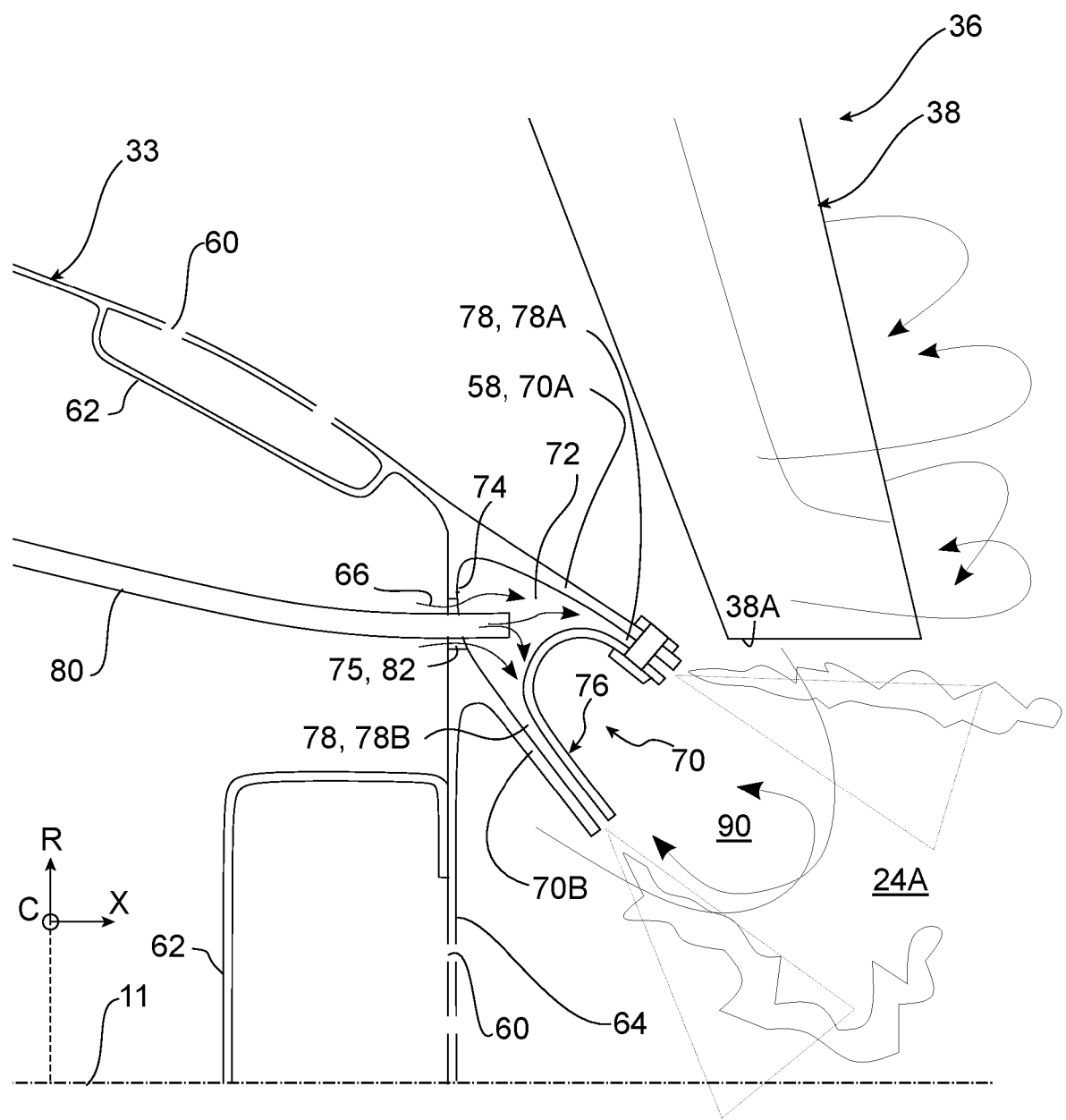
FIG. 4 is a view to a larger scale of a part of FIG. 3.

More precisely, with reference to FIGS. 3 and 4, a diffusion cone 33 according to a preferred embodiment of the invention includes a flame-holder ring 70 with a cross-section comprising an external branch 70A and an internal branch 70B rigidly connected to each other on the base 50 side of the cone, and such that the external branch 70A extends around the internal branch 70B.

In this way, the external 70A and internal 70B branches delimit between them an internal space 72 of the flame-holder ring 70, which emerges on the side opposite to the base 50 of the cone, i.e. in the downstream direction.

As indicated above, one of the external 70A and internal 70B branches is formed by the annular trailing edge 58. "Trailing edge" must be understood to mean the convergent-shaped downstream end of the diffusion cone 33, independently of the fact that this end is formed in a single piece with the rest of the cone or consists of a part or assembly attached to the transverse downstream end wall 64 of the cone, and independently of the fact that this end is formed by a single wall or a plurality of superimposed walls. In the preferential example illustrated, the diffusion cone is formed by a part extending in a single piece from the base 50 as far as the leading edge 54 inclusive.

In addition, in the preferred embodiment, it is the external arm 70A that is formed by the annular trailing edge 58 of the cone, which makes it possible to bring the flame-holder ring close to the core of the afterburner channel.

The two branches 70A, 70B are for example connected to the transverse downstream-end wall 64 of the cone at a distance from each other, so that the transverse wall 64 forms a bottom 74 of the internal space 72 of the flame-holder ring 70. The two branches 70A, 70B and the bottom 74 thus define a cross-section roughly in the form of a C for the flame-holder ring 70. In a variant, the two branches can be connected directly to each other and thus define a cross-section roughly in the form of a V for the flame-holder ring.

In the example illustrated, the two branches 70A, 70B diverge from each other in the downstream direction. Thus, the internal branch 70B has a degree of convergence downstream greater than that of the external branch 70A.

The flame-holder ring 70 includes one or more fuel inlets 75, for example formed in the bottom 74 of the internal space 72, to admit fuel in the internal space 72, as will appear more clearly hereinafter.

Moreover, an annular thermal-protection screen 76 is advantageously arranged between the external 70A and internal 70B branches so as to partially obstruct an opening 78 through which the internal space 72 emerges on the side opposite to the base 50 of the diffusion cone (i.e. on the downstream side). Such an annular screen 76 is for example concave so as to delimit, along each of the branches 70A and 70B, a corresponding outlet passage 78A, 78B of the internal space 72. The outlet passages 78A, 78B thus constitutes the non-obstructed part of the aforementioned opening 78 of the internal space 72.

The rear turbojet-engine part comprises a fuel-injection system, comprising one or more fuel pipes 80, where applicable distributed around the longitudinal axis 11, to inject fuel into the internal space 72 of the flame-holder ring 70 through the fuel inlet or inlets 75, and to allow ejection of said fuel into the afterburner channel 24 through the opening 78, in this case through the outlet passages 78A, 78B. It should be noted that such a fuel inlet 75 consists for example of a simple orifice enabling a corresponding fuel pipe 80 to pass. Such a fuel pipe has for example an end terminating in a multi-pierced wall to promote diffusion of the fuel in the internal space 72.

The fuel pipe or pipes pass, for example in the rear turbine housing TRF, to a suitable fuel supply device. One or more openings are formed through the downstream end 54 of the rear housing TRF to allow passage of the fuel pipe or pipes.

Furthermore, the rear turbojet-engine part advantageously comprises air-circulation means configured to supply the internal space 72 of the flame-holder ring 70 with air 66 coming from the secondary flow F3. These means comprise one or more air-passage orifices 82 formed in the bottom 74 of the internal space 72. One or more of the fuel inlets 75 can constitute such air-passage orifices 82, for example because of a clearance provided between the corresponding fuel pipe 80 and the edge of the fuel inlet 75, as shown by FIGS. 3 and 4.

In the embodiment illustrated, the rear part of the turbojet engine comprises an annular row of flame-holder arms 38 having respective radially internal ends 38A arranged axially facing the flame-holder ring 70 so as to be located in gas recirculation zones 90 caused by the branches 70A and 70B of the flame-holder ring, as shown more clearly in FIG. 4.

In addition, the rear part of the turbojet engine advantageously has no flame-holder ring connecting the arms in pairs, unlike what was described above with reference to FIG. 2. In other words, the flame-holder arms 38 of FIG. 3 extend freely with respect to each other from their radially external ends 38B. This is because the flame-holder ring 70 of the diffusion cone 33 ensures the circumferential propagation of the flame between the flame-holder arms 38.

The diffusion cone 33 according to the preferred embodiment of the invention advantageously includes anti-screech holes 60 and/or one or more anti-screech chambers 62, which are for example similar to those of the diffusion cone of FIG. 2. The diffusion cone 33 advantageously includes an "anti-screech" chamber 62 attached to the internal surface of the annular wall of the diffusion cone 33, facing the "anti-screech" holes 60 formed in this wall. This "anti-screech" chamber 62 is preferably closed, as is the "anti-screech" chamber 62 attached to the transverse wall 64, so as to avoid a circulation of air through the "anti-screech" holes 60 and thus to reserve more air coming from the secondary duct for the flame-holder ring 70.

In operation, the cool air 66 coming from the secondary duct and conveyed by the aforementioned air-circulation means enters the internal space 72 of the flame-holder ring 70 and thus thermally protects the flame-holder ring, both with regard to the surrounding flow of hot gases and with regard to the radiation from the flames.

This cool air is ejected out of the internal space 72 through the outlet passages 78A, 78B, and thus enters the core of the afterburner channel. This cool air thus improves the mixing of the gases coming from the primary and secondary flows in dry operating mode (i.e. without afterburning), which affords an improvement in the performances of the turbojet engine in terms of thrust.

During the operation of the afterburning, the internal space 72 of the flame-holder ring 70 is furthermore supplied with fuel by the fuel pipe or pipes 80. The fuel that has come therefrom mixes with the cool air from the secondary duct in the internal space 72 and escapes from the latter through the outlet passages 78A, 78B. Some of the fuel may also trickle in liquid form on the surfaces delimiting the outlet passages 78A, 78B and be sheared by the surrounding airflow at the outlet from said passages. In all cases, the flame-holder ring 70 thus enables the core 24A of the afterburner channel to be carburized, in particular the gas recirculation zones 90 caused by the branches 70A, 70B of the flame-holder ring 70. The latter thus contributes to control and circumferential propagation of the flame.

The flame at the core of the afterburner channel can be ignited by means of a conventional initiator at one or more of the flame-holder arms 38, along which the flame propagates radially inwards until it reaches the core 24A of the afterburner channel, where circumferential propagation of the flame is promoted by the recirculation zones 90 and the presence of fuel coming from the flame-holder ring 70.

What is claimed is:

1. A turbojet-engine rear part, comprising an afterburner channel, an afterburner-channel housing surrounding said afterburner channel, a diffusion cone internally delimiting an inlet of said afterburner channel, wherein the diffusion cone comprises an annular wall extending from a base while converging towards a downstream side of the diffusion cone where said annular wall forms a truncated tip of the diffusion cone defining an annular trailing edge of the latter, wherein the diffusion cone comprises a flame-holder ring with a cross-section comprising an external branch and an internal branch rigidly connected to each other at an upstream side of the flame-holder ring and such that the external branch extends around the internal branch, whereby the external and internal branches delimit between them an internal space of the flame-holder ring having an opening on the downstream side of the diffusion cone, one of the external and internal branches consisting of said annular trailing edge, and the flame-holder ring including at least one fuel inlet arranged for admitting fuel into the internal space of the flame-holder ring.

2. The turbojet-engine rear part according to claim 1, wherein the external branch is said branch consisting of said annular trailing edge.

3. The turbojet-engine rear part according to claim 1, further comprising an annular thermal-protection screen that is:
   arranged between the external and internal branches so as to partially obstruct an opening through which the internal space of the flame-holder ring opens on the downstream side of the diffusion cone, and
   conformed to delimit, along each of the external and internal branches, a corresponding outlet passage through which the internal space of the flame-holder ring opens on the downstream side of the diffusion cone.

4. The turbojet-engine rear part according to claim 1, wherein said fuel inlet is arranged on the upstream side of the flame-holder ring.

5. The turbojet-engine rear part according to claim 1, further comprising a flow-separation collar extending inside the afterburner-channel housing concentrically with the latter so as to externally delimit the inlet of the afterburner channel and to delimit, with the afterburner-channel housing, an annular channel forming a downstream end of a secondary duct for a secondary turbojet-engine flow.

6. The turbojet-engine rear part according to claim 1, comprising a fuel-injection system configured to inject fuel into the internal space of the flame-holder ring through said fuel inlet.

7. The turbojet-engine rear part according to claim 1, further comprising an annular row of flame-holder arms having radially internal ends arranged axially facing the flame-holder ring.

8. The turbojet-engine rear part according to claim 7, wherein the flame-holder arms extend freely with respect to each other from their radially external ends.

9. The turbojet-engine rear part according to claim 6, further comprising an air-circulation system configured to supply the internal space of the flame-holder ring with air coming from a secondary turbojet-engine flow.

10. A turbojet engine for an aircraft, comprising a rear part according to claim 1.

11. A turbojet-engine rear part, comprising an afterburner channel, an afterburner-channel housing surrounding said afterburner channel, a diffusion cone internally delimiting an inlet of said afterburner channel, wherein the diffusion cone comprises an annular wall extending from a base while converging towards a downstream side of the diffusion cone where said annular wall forms a truncated tip of the diffusion cone defining an annular trailing edge of the latter, wherein the diffusion cone comprises a flame-holder ring with a cross-section comprising an external branch and an internal branch rigidly connected to each other at an upstream side of the flame-holder ring and such that the external branch extends around the internal branch, whereby the external and internal branches delimit between them an internal space of the flame-holder ring having an opening on the downstream side of the diffusion cone, one of the external and internal branches consisting of said annular trailing edge, and the flame-holder ring including at least one fuel inlet arranged for admitting fuel into the internal space of the flame-holder ring, wherein the turbojet-engine rear part comprises a fuel-injection system configured to inject fuel into the internal space of the flame-holder ring through said fuel inlet, wherein the turbojet-engine rear part further comprises an annular row of flame-holder arms having radially internal ends arranged axially facing the flame-holder ring.

12. The turbojet-engine rear part according to claim 11, wherein the flame-holder arms extend freely with respect to each other from their radially external ends.

* * * * *